Feb. 6, 1934.  J. A. BROOKS ET AL  1,945,591
ELECTRICAL DISTRIBUTION SYSTEM
Filed May 13, 1932  3 Sheets-Sheet 1
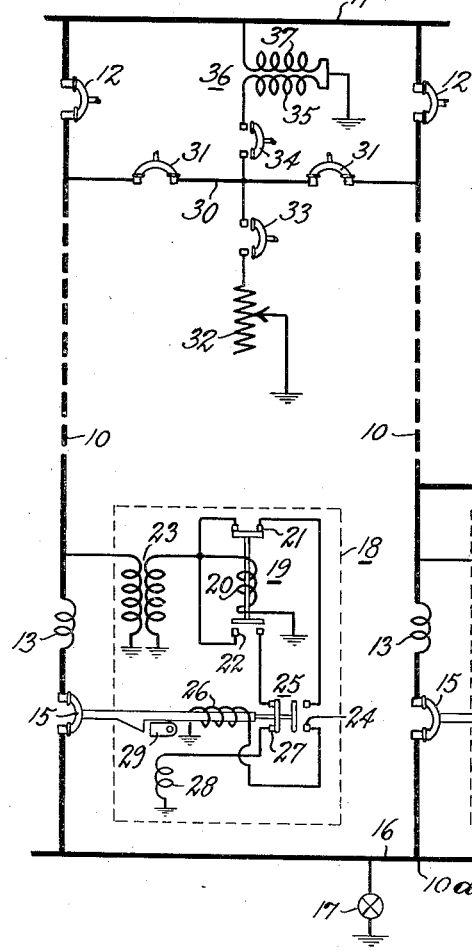
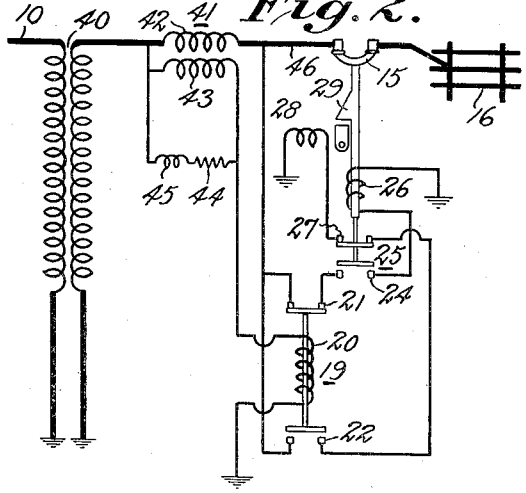
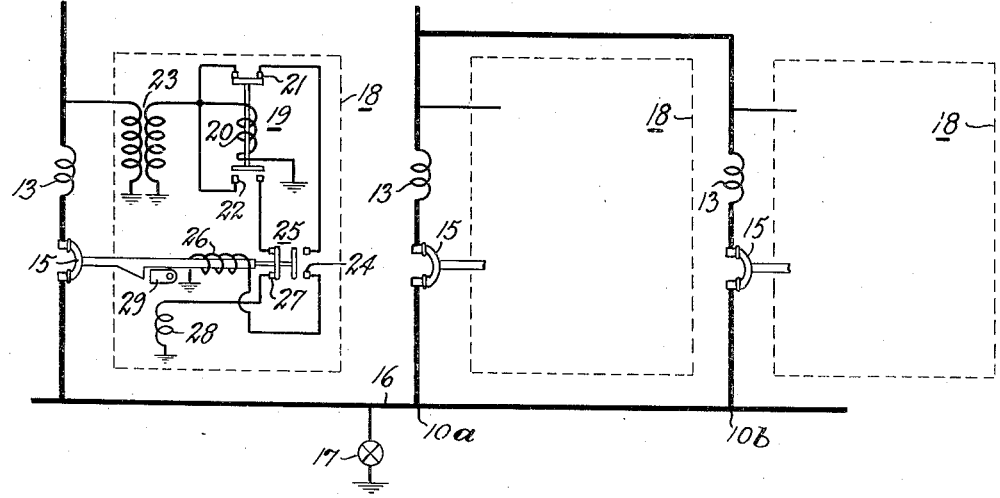
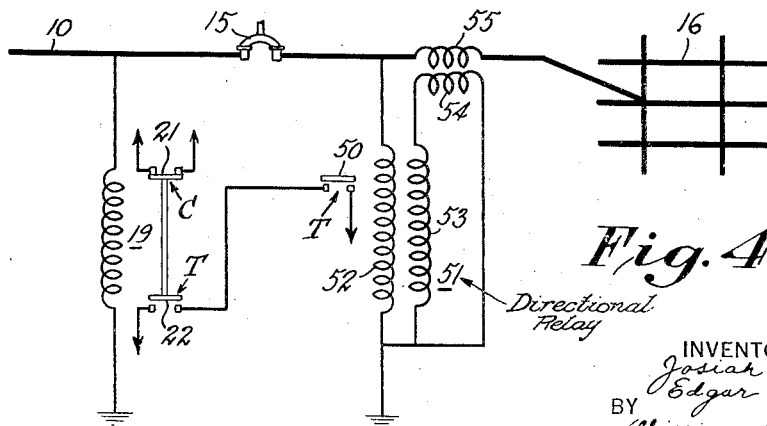
INVENTORS
Josiah A. Brooks
Edgar A. Cerf, Jr.
BY William G. McKnight
their ATTORNEY

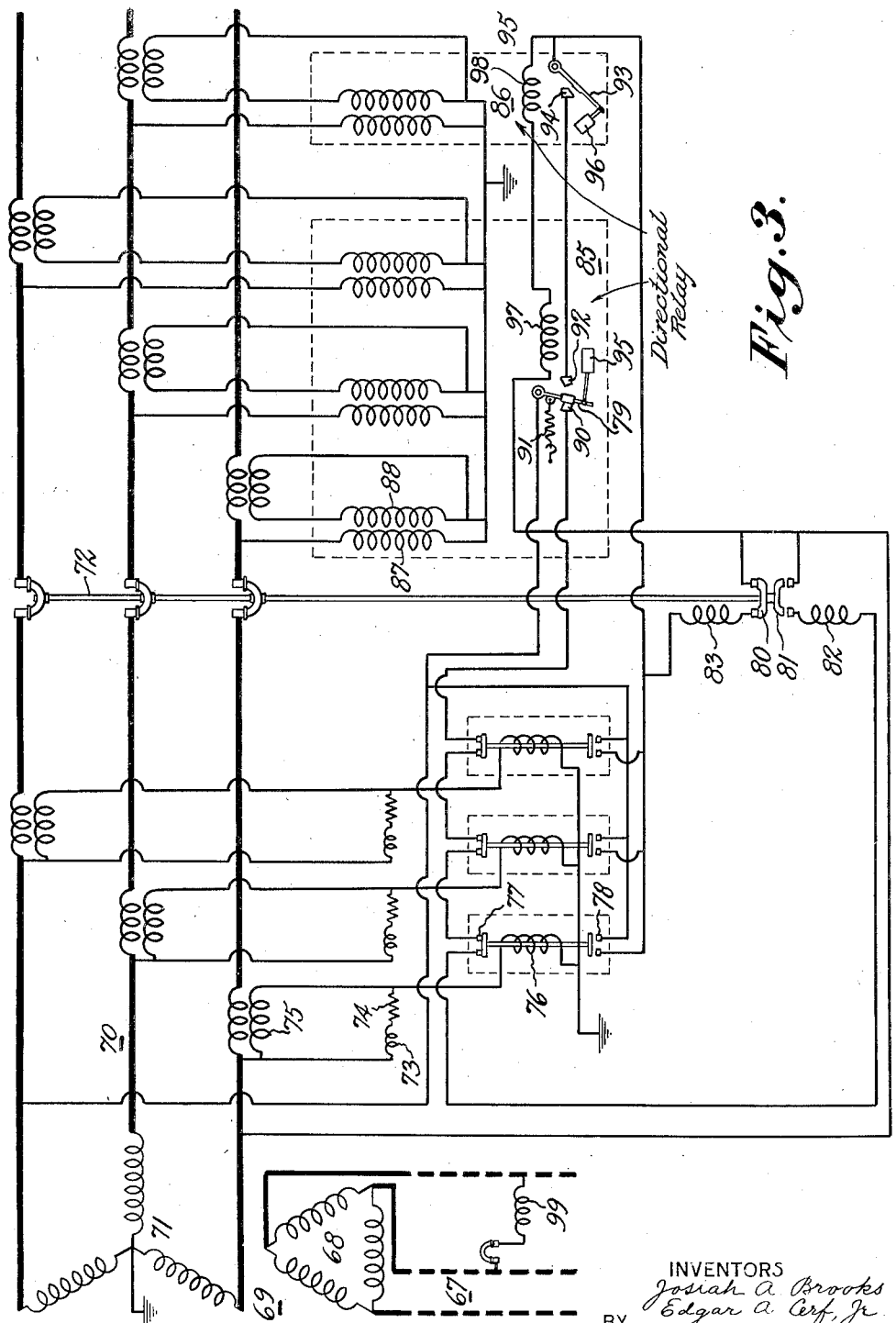

Patented Feb. 6, 1934

1,945,591

UNITED STATES PATENT OFFICE 1,945,591

ELECTRICAL DISTRIBUTION SYSTEM

Josiah A. Brooks, Douglaston, and Edgar A. Cerf, Jr., Brooklyn, N. Y., assignors to Brooklyn Edison Company, Inc., Brooklyn, N. Y., a corporation of New York Application May 13, 1932. Serial No. 611,006

15 Claims. (Cl. 175—294)

This invention relates to alternating current distribution systems in which a distribution network is supplied from one or more feeders, and more particularly to a protective device for automatically disconnecting a feeder from the network when a predetermined condition, such as a short circuit, arises on the feeder.

This application is a continuation in part of our copending application Serial No. 545,414 for Electrical distribution systems, filed June 19, 1931.

A network protector of the above type should trip automatically when there is a short circuit on the feeder with which it is associated and it should close when the circuit conditions are such that the feeder may supply power, or reactive volt-amperes, to the network. It should never close under circuit conditions that could cause tripping since repeated closing and tripping, or pumping, would be the result.

A device controlled by reverse power flow is capable, under certain conditions, of detecting the presence of short circuits on the feeder by a flow of energy through the network switch in the reverse direction. However, a high energy feed back is not always a true indication of a short circuit. For example, where generators are synchronized through the network grid, a large amount of power may back feed through the network switch with no fault on the system. On the other hand, the power back feeding into a fault may be comparatively small due to the low potential at the point of power measurement and to the low power factor under short circuit conditions.

An object of this invention is to provide a protective device which accurately detects short circuit conditions on network feeders and protects against them, but which is not affected by the direction of normal power flow.

A further object of the invention is to provide a protective device of the above character which automatically closes on the network when feeder voltage conditions are normal.

Another object is to provide a device for the purpose specified, which is simple, dependable, and efficient.

Modern power distribution systems are commonly designed to operate at substantially constant potentials. A feeder short circuit will cause the voltage of one or more phases of the feeder to fall to a value near zero, whereas the voltage of the network and of the other feeders is not greatly affected. In accordance with the present invention, the feeder voltage is used to control the protective device so as to open the network switch on reduced feeder voltage and to close the network switch when the feeder voltage is substantially normal or higher. This feeder voltage may be taken directly from the feeder, for example at a point adjacent the network switch, and may be used to control a loss of voltage relay by which the switch is operated.

If the feeder voltage is excessively high so that difficulties would be involved in applying the same directly to the loss of voltage relay, a transformer may be introduced between the feeder and the relay. In distribution systems in which a high voltage feeder is used to supply a low voltage distribution network, a step-down transformer is interposed between the feeder and the network. In such systems, the voltage for operating the relay may be taken directly from the secondary, or low voltage, side of the transformer. This voltage may be compensated for the voltage drop due to the internal impedance of the transformer so that the voltage applied to the relay is proportional to the true primary voltage.

In certain instances, as for example in low voltage systems which operate without step-down transformers, it may be desirable to introduce a directional relay in addition to the loss of voltage relay in order to distinguish between short circuit conditions or faults on the feeder and faults on the distribution network. In the usual system, however, in which a step-down transformer is employed, a fault on the network will not appreciably reduce the voltage on the feeder inasmuch as the voltage differential is mostly taken up by the internal impedance of the transformer.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in the various figures of which like reference characters have been used to designate like parts.

Fig. 1 is a schematic diagram of a distribution system showing a network protector arranged in accordance with the present invention;

Fig. 2 is a schematic diagram of a modified form of the invention;

Fig. 3 is a schematic diagram illustrating the application of the invention to a three-phase system;

Fig. 4 is a schematic diagram showing a directional relay associated with the loss of voltage relay.

Figure 5:
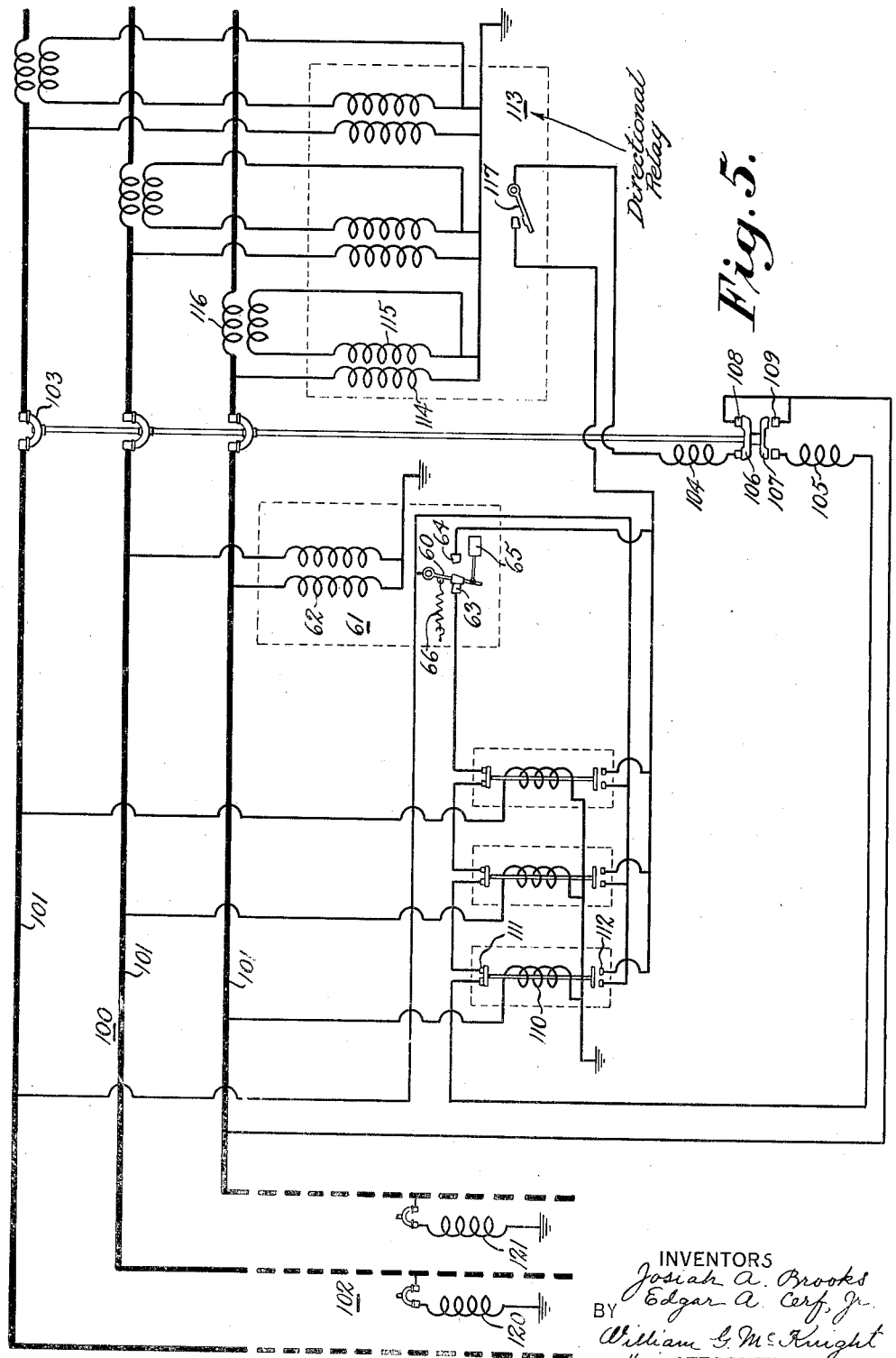
Fig. 5 is a schematic diagram showing the protector of Fig. 4 applied to a three-phase system.

In the following description and in the claims, various details will be identified by specific names for convenience, but they are intended to be as generic in their application as the art will permit.

Referring more particularly to the drawings, the invention is shown in Fig. 1 as applied to a single phase distribution system for simplicity of illustration. This system comprises a plurality of feeders 10 which are fed from common bus 11 to which they are connected by feeder switches 12. Bus 11 may represent a section of the control apparatus in the power station or may represent a remote line from which the various feeders are supplied. The feeders are connected through impedances 13 and network switches 15 to a distribution system or network 16 which includes a load represented at 17. Certain of the feeders may be tied to the network at a plurality of points as at 10a and 10b through individual impedances and switches. Each impedance 13 may comprise a transformer or other device across which a voltage drop takes place during operation of the system and is connected ahead of switches 15 so that the voltage on the feeder is normally higher than that at said switches when power is being supplied to the net work from the feeder.

For operating each of said switches 15 a protective device 18 is employed, comprising a loss of voltage relay 19 having a coil 20, closing contacts 21 and tripping contacts 22. Said relay is connected to feeder 10 on the feeder side of impedance 13 through a transformer 23 which, however, may be omitted provided the voltage of the feeder is such as to be safely and economically used for operating said relay. Closing contacts 21 are connected in series with contacts 24 of a pallet switch 25 and with solenoid 26, which when energized closes switch 15. Pallet switch 25 is mechanically connected to and operates in conjunction with switch 15. Tripping contacts 22 are connected in series with contacts 27 of pallet switch 25 and with tripping coil 28 which cooperates with latch 29 of switch 15 to release said switch when coil 28 is energized and to thereby permit said switch to open under the influence of a spring mechanism (not shown).

In the operation of so much of the system as has been above described, the loss of voltage relay 19 is so designed that when the voltage of feeder 10 is substantially equal to or above the normal operating voltage, the relay will maintain contacts 21 closed. If the network switch 15 is open, contacts 24 will be closed and thereby permit energization of coil 26 which causes said switch 15 to close. If switch 15 is already closed, contacts 24 will be open and the closing of contacts 21 of relay 19 will have no effect.

When a fault occurs on feeder 10, such as for example a short circuit, the voltage of said feeder will be reduced below the normal operating voltage by an amount which depends upon the nature of the fault. This reduction of voltage on feeder 10 causes loss of voltage relay 19 to close contacts 22 which, if switch 15 is closed, completes the circuit through contacts 27 and tripping coil 28. Tripping coil 28 thereupon operates latch 29 and permits switch 15 to open. When the switch 15 is open, the tripping circuit is opened at contacts 27 and the closing circuit is closed at contacts 24.

The switch, however, cannot reclose until the voltage on feeder 10 has been raised to approximately the normal operating voltage, at which point relay 19 again closes contacts 21 and completes the closing circuit of switch 15. It is preferable to so design relay 19 that the relay will close the closing contacts 21 only at a voltage which is substantially higher than the voltage at which the relay closes tripping contacts 22, otherwise repeated opening and closing of the switch might result from slight variations in feeder voltage.

If a fault occurs on the network 16, the voltage of feeder 10 will not be appreciably reduced due to the internal impedance of impedance 13 which as above stated may comprise a transformer or other impedance device. The voltage drop within said impedance is normally sufficient to compensate for the voltage differential between the feeder and the network and would prevent variations in network voltage from affecting relay 19. It is to be understood that the potential transformer 23 may be of any type which is capable of converting the voltage of the feeder 10 to a voltage suitable for operating relay 13, as for example a step-down transformer or a potential divider. Such device may be employed in cases where the feeder voltage is too high for safe and economical use on the relay.

In certain instances it may be desirable to voluntarily clear feeder 10 from network 16. This may be accomplished at the power house or at other points remote from switch 15 by opening feeder switch 12 and manually connecting feeder 10 to a control bus 30. For this purpose a switch 31 is provided between the control bus and each of the feeders so that the feeders can be selectively operated in the manner to be described. With the feeder connected to control bus 30, the voltage on said feeder may be reduced to a value such as to operate loss of voltage relay 19 and thereby trip switch 15. This may be accomplished by connecting control bus 30 through a fixed or adjustable impedance 32 to ground as by closing a switch 33. This establishes a partial short circuit on the feeder and causes the control device 18 to operate in the manner above pointed out.

In case it is undesirable to establish a partial short circuit on feeder 10, a switch 34 may be closed which connects control bus 30 with the secondary 35 of a step-down transformer 36, the primary 37 of which is connected to bus 11. A voltage is thus applied to a bus 30 and thence to feeder 10 which is less than the normal operating voltage and which may be adjusted to cause loss of voltage relay 19 to operate.

Many distribution systems utilize high voltage feeders which supply low voltage networks through power transformers. In systems of this type the equivalent feeder voltage may be obtained from the secondary of the power transformer by compensating the secondary voltage for the voltage drop through the impedance of the transformer. A system of this type is illustrated in Fig. 2, in which feeder 10, network 16 and network switch 15 are arranged in the manner shown in connection with Fig. 1.

In this figure network 16 is fed through line 46 and a step-down power transformer 40 which is connected between feeder 10 and switch 15. The loss of voltage relay 19 is provided for operating switch 15 through circuits described in connection with Fig. 1 and designated by similar reference numerals. Voltage for operating coil 20 of the loss of voltage relay is in this case, however, obtained from the secondary side of transformer 40 instead of from the high voltage feeder as illustrated in Fig. 1.

For this purpose a current transformer 41 is provided, having a primary 42 connected in series between the secondary of power transformer 40 and network switch 15. The secondary 43 of transformer 41 has connected in parallel thereto an impedance such as a resistance 44 and an inductive reactance 45. One side of said impedance is connected to low tension line 46, and the other side of said impedance is connected to coil 20 of loss of voltage relay 19.

The resistance 44 and the inductive reactance 45 are proportional respectively to the resistance and the leakage reactance of the power transformer 40. The secondary current of the current transformer 41 is proportional to the power transformer load current and produces a voltage drop in impedances 44 and 45 which is proportional to the voltage drop in the power transformer. This compensating voltage is connected in series with the power transformer secondary voltage to produce a potential across loss of voltage relay 19 which is proportional in magnitude to the network feeder voltage and is in phase with the feeder voltage.

In the above described system it is to be noted that the voltage applied to loss of voltage relay 19 is similar to the voltage applied to said relay in the system of Fig. 1, although in one case the voltage is obtained directly from feeder 10, whereas in the other case the voltage is obtained from the secondary side of the power transformer and is compensated for the voltage drop within the transformer so that it reflects the true voltage conditions in the feeder. This system permits the network protector to be connected in the low tension side of the power transformer and thereby avoids the necessity for designing apparatus to withstand the high primary voltages or the necessity for a step-down transformer, such as transformer 23 in Fig. 1. In the case of a fault on the network 16, the loss of voltage relay 19 of Fig. 2 is not operated inasmuch as the sign of the voltage drop in impedances 44 and 45 is reversed with respect to the sign of such voltage drop when a fault occurs on feeder 10 and reflects the reversal of voltage drop through the internal impedance of transformer 40.

It is evident therefore that the compensation is dependent upon both the magnitude and direction of the power flow as well as upon the voltage in the feeder itself.

When the resistance of the power transformer is small compared with the leakage reactance thereof, it may not be necessary to compensate for resistance drop. In such cases resistance 44 may be omitted and the entire compensation obtained by means of the voltage drop in reactance 45.

If the current transformer 41 is designed to utilize a large portion of its primary current for excitation purposes, its secondary voltage will be proportional to the primary current and will lead the current by approximately 90°. In such cases the reactance compensation can be incorporated in the current transformer itself and the necessity for an external compensating reactance 45 is avoided.

In certain instances resistance compensation alone may be employed by utilizing a resistance such that the entire compensating voltage drop takes place therein. For such systems external reactance 45 may be omitted.

It is to be understood that under compensation or over compensation may be desirable in certain instances, and this can be obtained by suitable selection of impedance either external to the transformer or internal thereof. For example, under compensation can be used to protect against internal transformer faults. Over compensation produces an extremely sensitive condition and causes the relay to operate in response to smaller line disturbances. If over compensation is used, it may be necessary to include some limiting device to prevent extreme changes in line voltage from building up a voltage of reversed polarity on the relay. This may be accomplished, for example, by the use of a saturating current transformer which makes the relay sensitive to voltage changes under small currents but comparatively insensitive at larger values of current. It is evident, therefore, that the compensation is a function of both the feeder voltage and the feeder current.

The inherent impedance of the power transformers will in general cause secondary network faults to produce little effect on feeder voltage inasmuch as the drop in voltage will occur chiefly through the network transformer impedance. Feeder under-voltage relays of the above type will therefore be selective between feeder faults and secondary faults. In certain instances, however, where power transformers or other equivalent impedances are not installed between the feeders and the network, reverse power relays may be used in conjunction with the loss of voltage relays to indicate the location of the fault.

A system of this type is illustrated in Fig. 4, in which feeder 10 represents a feeder such as a low voltage feeder which is directly connected to network 16 by means of network switch 15. The loss of voltage relay 19 having closing contacts 21 and tripping contacts 22 is similar in construction to that illustrated in Figs. 1 and 2. In Fig. 4, however, tripping contacts 22 are connected in series with contacts 50 of a reverse power or directional relay 51. Said directional relay comprises a potential coil 52 which is connected across the line on the network side of the switch 15 and a current coil 53 which is connected across the secondary 54 of a current transformer, the primary 55 of which is connected in series with feeder 10.

This directional relay operates on the principle of a watt hour meter, that is, the potential coil and the current coil are so arranged that the fluxes set up by the coils therein pass through a metal disc. The flux due to the power component of current passing through the current coil 53 is 90° out of phase with that due to the current in the potential coil 52, and the combined effect of the two fluxes is to set up a rotary magnetic field which induces eddy currents in the disc, thereby producing a torque which tends to rotate the disc with the magnetic field. The above construction of watt hour meters is well known and has accordingly not been illustrated in detail.

The current and potential coils are so connected that the disc is caused to rotate in the direction to close relay contacts 50 when power flows into the feeder from network 16 and is caused to rotate in the direction to open contacts 50 when the power flow is from the feeder toward the network. It will be noted that in the system of Fig. 4 the network switch 15 will be closed when the voltage in feeder 10 is such that closing contacts 21 of the loss of voltage relay are closed. That is, the switch 15 will remain closed whenever the voltage in feeder 10 is approximately normal or above. The switch 15 will not open, however, unless contacts 22 and 50 are both closed. Contacts 22 are closed, as described in connection with Figs. 1 and 2, when the voltage on feeder 10 is reduced. Contacts 50, however, are only closed when power flows from the network into the feeder, that is, when a fault exists upon the feeder. If a fault occurs on the network, the power flow will be toward the network and contacts 50 will remain open. The directional relay 51 accordingly distinguishes between faults on the feeder and faults on the network and prevents network switch 15 from operating in response to network faults. Obviously in systems such as in Figs. 1 and 2 where the network voltage is not reflected upon the feeder, the use of a directional relay is not required.

In cases where generators are synchronized through the low voltage A. C. network and a short circuit occurs on the network feeder associated with one generator, there will be a power flow from the network into the faulty feeder, and there may also be a reversal of power flow in other network feeders supplied by the same generator. However, there is an inherent time delay under these conditions before the reversal takes place in the other feeders. This time delay and the amount of reversal varies with the distance that the short circuit occurs from the generating station and the load being supplied from the generator. Should this inherent time delay be insufficient, the protective devices on the other feeders may be prevented from operating under these conditions by including a time delay on all directional relays. This time delay would necessitate a reversal of power for a certain predetermined time before operation of the relay, and would afford sufficient time for the feeder containing the short circuit to be disconnected without also disconnecting the various other feeders due to the unusual line conditions.

Referring to Fig. 3, the protective system illustrated in Fig. 2 is shown as applied to a three phase delta-star connected system with grounded neutral and is combined with a preferred type of intentional trip. In this figure, a three phase power line 70, energized from the secondary 71 of a power transformer 69, feeds a utilization circuit through circuit breaker 72. Primary 68 of transformer is delta connected to feeder 67 which corresponds to feeder 10 of Fig. 2. A plurality of compensating impedances, comprising inductances 73 and resistances 74, are connected across the secondaries of current transformers 75, the primaries of which are connected in the three lines of the three phase system. A loss of voltage relay 76 is connected in series with each of said impedances in the manner described in connection with loss of voltage relay 19 of Fig. 2, and is provided with closing contacts 77 and tripping contacts 78.

Closing contacts 77 are connected across one phase of line 70, in series with switch 79, and with closing coil 82 which is adapted to close the circuit breaker 72. The tripping contacts 78 of the three relays 76 are connected in parallel and the combination connected across one phase of line 70 in series with tripping coil 83, which is adapted to trip circuit breaker 72. Coils 83 and 82 are connected through switches 80 and 81, respectively, to one side of the three phase line. Said switches are associated with the circuit breaker 72 and are operated in accordance with the position of said circuit breaker.

In the operation of the system thus far described, it will be noted that operation of any one of the three loss of voltage relays 76 will close a pair of tripping contacts 78 and energize tripping coil 83, whereby the circuit breaker will be automatically opened. In order to close the circuit breaker, however, the three relays 76 must be operated to close the three sets of closing contacts 77, thereby energizing closing coil 82.

It is evident, therefore, that loss of voltage on any phase at the transformer primary is sufficient to trip the network protector, but a normal line voltage must be applied to all three phases before the circuit breaker will again close. The operation in this respect is similar to that previously described in connection with Fig. 2.

In the above described system the loss of voltage relays are preferably set so that an extremely low voltage is required in order to bring them to the tripping position. This low voltage would require practically a short circuit at the station in order to open the protector voluntarily from that point. In order to avoid the necessity for disturbing the system to this extent, an intentional tripping device may be incorporated with the above system, which comprises a three phase directional relay 85 and a single phase directional relay 86. The three phase directional relay comprises potential coils 87 and current coils 88, which are associated with each of the three phases of the distribution system in the manner described in connection with the directional relay 51 of Fig. 4. Relay 85 is designed to operate switch 79 so that closing contact 90 is normally closed in response to the action of spring 91 or when three phase energy flows from the feeder into the utilization circuit or network, and tripping contact 92 is closed when three phase energy flows in the reverse direction.

Single phase directional relay 86 operates switch 93, and is so connected that contact 94 will be closed when single phase energy in the phase to which the relay is connected flows from the feeder to the network, and will be opened when single phase energy flows in the reverse direction. Time delay devices 95 and 96, such as dash pots, may be associated with switches 79 and 93, respectively, for delaying the operation thereof sufficiently to prevent their operation in response to normal fluctuations in line conditions.

A holding coil 97 is associated with switch 79 to hold contact 90 open after the relays have once operated until the feeder is deenergized or power flows toward the network. This prevents the immediate reclosure of the circuit breaker due to the fact that the loss of voltage relay 76 may be in the closing position.

The closing contact 90 of the three phase relay 85 is connected in series with the closing contacts 77 of relays 76. Tripping contact 92 of relay 85 is connected in series with contact 94 of relay 86, and the two are connected in parallel with tripping contacts 78 of relays 76.

A holding coil 98 is associated with switch 93. Holding coils 97 and 98 are connected in series with switch 93 and contact 92 of switch 79 across one phase of line 70.

In the above system, which is particularly applicable to a delta-star connected power transformer, the protector may be intentionally tripped by placing a single phase line to line load 99 on the feeder at the generating station. This load will cause three phase power to back feed from the network to the feeder, and single phase power to flow into the network from the feeder. This condition causes directional relays 85 and 86 to operate, thereby closing the two tripping contacts 92 and 94 and energizing tripping coil 83 of the circuit breaker 72. This operation is produced with practically no disturbance on the system, although the peculiar condition required to operate the two relays is not likely to obtain during the normal operation of the system.

Referring now to Fig. 5, the protective system illustrated in Fig. 4 is shown as applied to a three phase transmission line 100, comprising conductors 101, which are associated with a three phase feeder 102. A three phase circuit breaker 103 is connected in conductors 101 for controlling the flow of power to a network or other utilization circuit, not shown. Circuit breaker 103 is provided with a tripping coil 104 and a closing coil 105 and carries pallet switches 106 and 107 which cooperate with contacts 108 and 109, respectively, when the circuit breaker is in closed or open position. Three loss of voltage relays 110, having closing contacts 111 and tripping contacts 112, are connected from the respective conductors 101 of line 100 to ground. A three phase directional relay 113, having potential coils 114 and current coils 115, the latter energized from current transformers 116, is connected to the three conductors of the three phase line, and is arranged to close switch 117 when three phase power flows from the network toward the feeder and to open said switch when the power flows from the feeder to the network. This switch corresponds to tripping contacts 50 of Fig. 4, and is connected in series with tripping coil 104, and contacts 108 of switch 106, and with the three tripping contacts 112 of the loss of voltage relays, so that whenever one of said contacts 112 is closed, and switches 117 and 106 are closed, the tripping coil 104 will be operated for opening the circuit breaker 103.

The closing contacts 111 of the various relays 110 are connected in series through switch 60 with closing coil 105 and contacts 109. When the circuit breaker is in open position, the switch 107 closes contacts 109 and when the voltage on the feeder has risen to a value sufficient to operate relays 110 and close the three sets of closing contacts 111, coil 105 will be energized, thereby causing the circuit breaker to close. The operation of the system is otherwise similar to that described in connection with Fig. 4, although it is to be noted that the tripping coil is operated whenever the loss of voltage in one phase is sufficient to operate one of the relays 110, provided directional relay 113 is also operated to close switch 117, but that the closing coil will only operate when the voltage in all three phases has risen sufficiently to close the closing contacts of the three relays 110.

The circuit breaker could be intentionally tripped from the station by opening the feeder switch, and applying a voltage to the station end of the feeder of reduced magnitude and slightly lagging phase angle. In certain cases, however, it may be undesirable to trip the protective device in this manner. In such cases the voluntary trip may be obtained by voltage differential relay 61, comprising a pair of coils 62, which are connected from different phases of the line to ground and control the position of switch 60 with respect to closing contacts 63 and tripping contacts 64.

The switch 60 is so connected in the circuit that closing contacts 63 are in series with closing contacts 111 of relays 110, and tripping contacts 64 are in parallel with tripping contacts 112 of relays 110. A dash pot 65, or other time delay device, may be employed to retard the action of the voltage differential relay, and prevent its operation in response to normal line variations. The relay is preferably constructed with a spring 66 to normally maintain switch 60 in engagement with closing contacts 63. The relay tends to close contacts 64 when the balance between voltages impressed across coils 62 is disturbed, as will result by application of different loads 120, 121 to the two phases to which said coils are connected. In order to effect closure of this contact 64, however, the energization must continue over a predetermined period of time, which may be as great as three or four minutes. This time delay prevents operation of the tripping device in response to short circuits on the feeder system, and allows sufficient time for all short circuits to be cleared from the system by the operation of the proper switches before the differential voltage relay will operate. A time delay of the amount specified is not objectionable because the unbalance in voltages required to operate the relay is comparatively small and would not appreciably disturb the system.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What we claim is:

1. In an alternating current distribution system comprising a utilization circuit supplied by an alternating current feeder through a circuit breaker, the method of protecting the utilization circuit against short circuits on the feeder which comprises causing said circuit breaker to open only in response to a loss of voltage on the feeder accompanied by a flow of power from the utilization circuit to the feeder.

2. In an alternating current distribution system comprising a utilization circuit supplied by an alternating current feeder through a circuit breaker, the method of protecting the utilization circuit against short circuits on the feeder which comprises causing said circuit breaker to open only in response to a loss of voltage on the feeder accompanied by a flow of power from the utilization circuit to the feeder and causing said circuit breaker to reclose in response to the restoration of the voltage of said feeder to a predetermined value.

3. In an alternating current distribution system comprising a utilization network supplied from a feeder through an electrical impedance and a circuit breaker, a loss of voltage relay connected to the network side of said impedance and adapted to operate said circuit breaker, and compensating means for applying to the said loss of voltage relay a potential which is a function of the feeder potential and current, said relay being adapted to open said circuit breaker upon a predetermined drop in the voltage applied thereto and to close said circuit breaker when said feeder voltage is restored to a predetermined value.

4. In an alternating current distribution system comprising a utilization network supplied from a feeder through an electrical impedance and a circuit breaker, a loss of voltage relay connected to the network side of said impedance and adapted to operate said circuit breaker, and means comprising an impedance connected in the relay circuit and carrying a current proportional to the current flowing through said first impedance for applying to the said loss of voltage relay a potential which is a function of the feeder potential and current, said relay being adapted to open said circuit breaker upon a predetermined drop in the voltage applied thereto and to close said circuit breaker when said feeder voltage is restored to a predetermined value.

5. In an electrical system comprising a network fed by one or more feeders through switching devices and electrical impedances, a protective device for automatically operating each of said switching devices comprising a voltage relay adapted to open said switching devices upon a predetremined drop in the voltage applied to said relay, means supplying said voltage relay with a voltage obtained from the network side of said impedance, and a compensating circuit interposed in the relay circuit, said compensating circuit having an impedance of such magnitude that the voltage drop therein exceeds the voltage drop across the said first impedance corrected for the ratios of any intervening transformers.

6. In an electrical system comprising a network fed by one or more feeders through switching devices and electrical impedances, a protective device for automatically operating each of said switching devices comprising a voltage relay adapted to open said switching devices upon a predetermined drop in the voltage applied to said relay, means supplying said voltage relay with a voltage obtained from the network side of said impedance, and a compensating circuit interposed in the relay circuit, said compensating circuit comprising an impedance having a magnitude such that the voltage drop therein is less than the voltage drop across said first impedance corrected for the ratios of any intervening transformers.

7. In an electrical system comprising a network fed by one or more feeders through switching devices and electrical impedances, a protective device for automatically operating each of said switching devices comprising a voltage relay adapted to open said switching devices upon a predetermined drop in the voltage applied to said relay, means supplying said voltage relay with a voltage obtained from the network side of said impedance, and a compensating circuit interposed in the relay circuit, said compensating circuit comprising a compensating transformer having its primary winding in series with said switching device and its secondary winding in series with the voltage relay circuit, said transformer having an exciting current which is large compared with its secondary current, the reactance of said compensating transformer being such that the voltage induced in the secondary of the compensating transformer bears a definite relation to the reactive voltage drop across said impedance.

8. In an alternating current distribution system comprising a utilization circuit and a supply feeder, a circuit breaker connected in said feeder, and means for opening said circuit breaker, said means being adapted to operate only in response to loss of voltage in said feeder accompanied by reversal in direction of power flow whereby said circuit breaker is automatically opened in response to certain undesired circuit conditions on said feeder.

9. In an alternating current distribution system comprising a utilization circuit and a supply feeder, a circuit breaker included in said feeder, and means for operating said circuit breaker comprising a voltage relay having closing and tripping contacts and being responsive to voltage variations of said feeder, and a directional relay having tripping contacts and being responsive to the direction of power flow in said feeder, said relays having their tripping contacts connected in a series circuit adapted to trip said circuit breaker in response to loss of voltage on said feeder accompanied by reversal of power flow, the closing contacts of said voltage relay being adapted to close said circuit breaker when normal voltage is applied to said feeder.

10. In an electrical system comprising a network fed by one or more feeders through switching devices and electrical impedances, a protective device for automatically operating said switching devices comprising a voltage relay adapted to open said switching devices upon a predetermined drop in the voltage applied to said relay, means supplying said voltage relay with a voltage obtained from the network side of said impedance, and a compensating circuit interposed in the relay circuit, said compensating circuit comprising a compensating transformer having its primary winding in series with said switching device, and its secondary winding in series with the voltage relay circuit, said transformer saturating at predetremined load currents whereby to prevent extreme changes in line current from reversing the polarity of the voltage at the relay, the reactance of said compensating transformer being such that the voltage induced in the secondary of the compensating transformer bears a definite relation to the reactive voltage drop across said impedance.

11. In an alternating current distribution system comprising an utilization circuit and a supply feeder, a circuit breaker connected to said feeder, means for opening said circuit breaker only in response to loss of voltage in said feeder accompanied by reversal of direction of power flow therein, and means for closing said circuit breaker in response to restoration of voltage on said feeder to a predetermined value.

12. In an alternating current distribution system comprising a utilization circuit and a supply feeder, a circuit breaker included in said feeder, means for tripping said circuit breaker in response to loss of voltage on said feeder accompanied by reversal of power flow comprising a voltage relay operable only in response to voltage variations on said feeder, and a directional relay operable only in response to the direction of power flow of said feeder, said relays having tripping contacts arranged in a series circuit adapted to trip said circuit breaker upon operation of both of said relays.

13. An alternating current distribution system comprising a utilization circuit supplied from the feeder through an electrical impedance and a circuit breaker, a loss of voltage relay connected to the network side of said impedance and adapted to operate said circuit breaker when the voltage supplied to said relay falls below a predetermined value, and compensating means for applying to said loss of voltage relay a potential which is a function of the feeder potential and current whereby said relay is adapted to open said circuit breaker in response to certain undesired feeder conditions.

14. In an electrical system comprising a network fed by one or more feeders through switching devices and electrical impedances, a protective device for automatically operating each of said switching devices, comprising a voltage relay, means supplying said voltage relay with a voltage obtained from the network side of said impedance and a compensating circuit interposed in the relay circuit, said compensating circuit comprising a compensating transformer having its primary winding in series with said switching device and its secondary winding in series with the voltage relay circuit, said transformer having an exciting current which is large compared with its secondary current, the reactance of said compensating transformer being such that the voltage induced in the secondary of the compensating transformer bears a definite relation to the reactive voltage drop across said impedance, and a resistance connected in series with said secondary winding adapted to introduce a voltage drop which is a function of the voltage drop across the resistance component of said impedance.

15. In an alternating current distribution system comprising a low voltage utilization circuit supplied through a step-down transformer from a high voltage feeder and having a circuit breaker connected between the secondary of said transformer and said utilization circuit, a loss of voltage relay connected across the secondary of said transformer and adapted to operate said circuit breaker, an impedance connected in series with said relay, and means for applying to said impedance a current proportional to the secondary current of said transformer whereby the voltage drop in said impedance is a function of said secondary current, the relay being adapted to open the secondary in response to a predetermined drop in the voltage applied thereto and to close the circuit breaker when the feeder voltage is restored to a predetermined value.

JOSIAH A. BROOKS.
EDGAR A. CERF, Jr.